(12) United States Patent  
Wang et al.

(10) Patent No.: US 8,830,419 B2  
(45) Date of Patent: Sep. 9, 2014

(54) BACKLIGHT MODULE AND LIQUID CRYSTAL DISPLAY DEVICE

(75) Inventors: Jiaqiang Wang, Guandong (CN); Gang Yu, Guandong (CN)

(73) Assignee: Shenzhen China Star Optoelectronics Technology Co., Ltd

( * ) Notice: Subject to any disclaimer, the term of this patent is extended or adjusted under 35 U.S.C. 154(b) by 119 days.

(21) Appl. No.: 13/642,551

(22) PCT Filed: Sep. 12, 2012

(86) PCT No.: PCT/CN2012/081287  
§ 371 (c)(1),  
(2), (4) Date: Oct. 21, 2012

(87) PCT Pub. No.: WO2014/036746  
PCT Pub. Date: Mar. 13, 2014

(65) Prior Publication Data  
US 2014/0071370 A1     Mar. 13, 2014

(51) Int. Cl.  
G02F 1/1333 (2006.01)  
F21V 8/00 (2006.01)

(52) U.S. Cl.  
CPC .................................... *G02B 6/0088* (2013.01)  
USPC .............................................. 349/58; 349/65

(58) Field of Classification Search  
CPC .................... G02F 1/133308; G02F 1/133615; G02F 1/133606; G02F 1/1336; G02F 1/1333; G02F 1/133608; G02F 1/133611; G02F 1/133504; G02F 1/1335; G02F 2001/133607; G02F 2001/133317; G02F 2001/133325; G02F 2001/133322; G02F 2001/46; G02B 6/0088; G02B 6/0035; G02B 6/0053; G02B 6/0011; G02B 6/0051; G02B 6/0001; G02B 6/0043; G02B 6/005; G02B 6/00; G02B 6/0015; G02B 6/0018; G02B 6/0025; G02B 6/0028; G02B 6/34; G02B 6/42; G02B 5/045; F21V 13/02; F21V 15/01; F21V 21/00; F21K 9/52  
USPC ........ 349/58, 62, 65, 60; 362/606, 97.1, 97.2, 362/433, 608, 634, 257, 607, 615; 385/129  
See application file for complete search history.

(56) References Cited  
U.S. PATENT DOCUMENTS  
7,697,090 B2 *   4/2010   Shimizu ........................ 349/65  
\* cited by examiner

*Primary Examiner* — Thoi Duong  
(74) *Attorney, Agent, or Firm* — Andrew C. Cheng

(57) ABSTRACT

The present invention provides a backlight module, which comprises a waveguide has an incident surface and light-emitting surface. A light source is arranged on a side of the incident surface. An optical module is arranged above the waveguide and facing the light-emitting surface. The optical module includes a least one optical film having a crease at one side thereof. At least a positioning arrangement is arranged on a side surface of the waveguide other than the incident surface. A space is defined between the positioning arrangement and the side surface of the waveguide. The crease of the optical film is received within the space. The present invention further provides a liquid crystal display module incorporated with a backlight module disclosed. Accordingly, when the optical films is experiencing an expansion or contraction resulted from temperature gradient, the robust can always make the optical films properly seated within the receiving space defined by the positioning arrangement and the waveguide. As a result, the optical films can be effectively prevented from being deformed or creating a wave-form deformation.

12 Claims, 4 Drawing Sheets

BACKLIGHT MODULE AND LIQUID CRYSTAL DISPLAY DEVICE

CROSS REFERENCE

This application is claiming a priority arisen from a patent application, entitled with "Backlight Module and Liquid Crystal Display Device", submitted to China Patent Office on Sep. 7, 2012, designated with an Application Number 201210328870.2. The whole and complete disclosure of such patent application is hereby incorporated by reference.

FIELD OF THE INVENTION

The present invention relates to a technology of TFT-LCD (Thin Film Transistor Liquid Crystal Display), and more particularly, to a backlight module and a liquid crystal display module incorporated with such a backlight module.

DESCRIPTION OF PRIOR ART

TFT-LCD has become a very important platform for the display of modern information technology, and video products. As shown in FIG. 1, there is shown a cross-sectional view of a module of a liquid crystal display. The liquid crystal display module includes a liquid crystal display panel 2, a backlight module 1 and the supporting means. Wherein the backlight module 1 is provided in the liquid crystal display panel rear to provide light to the liquid crystal display panel; support means for supporting and fixing the liquid crystal display panel and the backlight module. The supporting device includes a backboard 3, a plastic frame 1 and the covering on the plastic frame on the annular glass plate 5, so that the liquid crystal display panel 2 is surrounded by a border 6 surrounded, and then the liquid crystal display module is mounted to the liquid crystal display enclosure. The backplane 3 includes a rectangular base plate 30 and a plurality of support plate 31, the supporting plate 31, respectively, and extending from the edge of the bottom plate 30 a direction perpendicular to the bottom plate 30 extends out to the bottom plate 30 and the supporting plate 31 together form an accommodating space. The backlight module 1 includes a light source (not shown) and the reflecting plate 14, a light guide plate 13, and the optical film module (10, 11, 12). The reflecting plate 14, the waveguide 13 and the optical film module sequentially disposed on the base plate 30 and accommodated in the accommodating space, and to provide a uniform surface light to the liquid crystal display panel 2. Optical film module includes a number of optical films, such as diffusion plate or prism board, which are arranged onto a light-emitting surface of the waveguide 13. The plastic frame 4 surrounds around the backboard, which comprises annular fixed frame 40, surrounded by the supporting plate 31, as well as several platforms 41 extending outward from each side of the fixed frame 40 in a direction parallel to the bottom plate, the platform 41 is subjected to a support of the supporting plate 31, and partially erected above the outer edge around the group of the optical diaphragm, and between the group of the optical diaphragm is formed with a certain pitch, it is generally known. The spacing should be controlled between 0.15-0.2 mm, in order to ensure that the optical film module to keep in flat when heated, without deformation resulted from expansion of the optical film module, i.e. the so called Waving. In addition, in the above described liquid crystal display device, the platform merely supports to the support plate alone, and the distance between the edge of the support plate and the optical film module is limited. When the optical film module is exposed with heat under the accepted high temperature test, it is easy to undergo a thermal expansion lead to lack of space caused by the deformation of the wavy (Waving). Consequently, negatively affecting the picture of the liquid crystal display device, and even cause the optical film to loose in worse scenario.

SUMMARY OF THE INVENTION

It is an object of this present invention to provide a backlight module and a liquid crystal display module incorporated with such a backlight module so as to effectively prevent an optical film from warping resulted from overheated.

In order to resolve the problem encountered by the prior art, the present invention provides a backlight module, which comprises:

A waveguide has an incident surface and light-emitting surface. A light source is arranged on a side of the incident surface.

An optical film module is arranged above the waveguide and facing the light-emitting surface. The optical film module includes a least one optical film having a crease at one side thereof.

At least a positioning arrangement is arranged on a side surface of the waveguide other than the incident surface. A space is defined between the positioning arrangement and the side surface of the waveguide. The crease of the optical film is received within the space.

Preferably, the positioning device is generally an elongate shape, and includes:

A pair of anchoring portions is arranged on opposite ends thereof. The anchoring portions are located on the same level, and flushed to the side surface of the waveguide when attached thereto.

A bridge portion is arranged between those two anchoring portions. A receiving space is defined between the anchoring portions and the bridge portion, and the side surface of the waveguide.

Preferably, the positioning further includes:

At least an attaching portion extends perpendicularly from at least one of the anchoring portions. The attaching portion can be readily attached to a top surface or bottom surface of the waveguide.

Preferably, the anchoring portions are glued to the side surface of the waveguide. The attaching portion is also glued to the top or bottom surface of the waveguide.

Preferably, the optical film module includes a first diffuser, a prism, and a second diffuser. Each of the first diffuser, the prism, and the second diffuser is provided with at least a crease at one side. Each of the creases can be folded to create a perpendicular relationship with respect to the optical film. The crease can be received within the receiving space defined by the anchoring portions, the bridge portion, and the side portion of the waveguide.

Preferably, the bottom surface of the waveguide is further provided with a mirror.

Preferably, the waveguide and the light source is assembled together by a backboard.

Correspondingly, according to another embodiment, the present invention further provides a liquid crystal display module which is incorporated with a backlight module described above.

The backlight module and the liquid crystal display can be concluded with the following advantages.

According to the embodiment of the present invention, the creases of each of the optical films can be readily received within a receiving space defined between the positioning arrangement and the side surface of the waveguide. As such, the optical films can be securely positioned easily and simply.

In addition, in order to ensure the proper positioning of the optical films, a robust clearance is spared. Accordingly, when the optical films is experiencing an expansion or contraction resulted from temperature gradient, the robust can always make the optical films properly seated within the receiving space defined by the positioning arrangement and the waveguide. As a result, the optical films can be effectively prevented from being deformed or creating a waveform deformation.

In addition, the positioning arrangement can be readily applied to all kind of liquid crystal display module within any modification or alteration. As a result, it readily reduces the cost for production.

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings.

SUBSTANTIAL IMPLEMENTATION

Detailed description will be given by the preferred embodiments along with the accompanied drawings.

Figure 1:
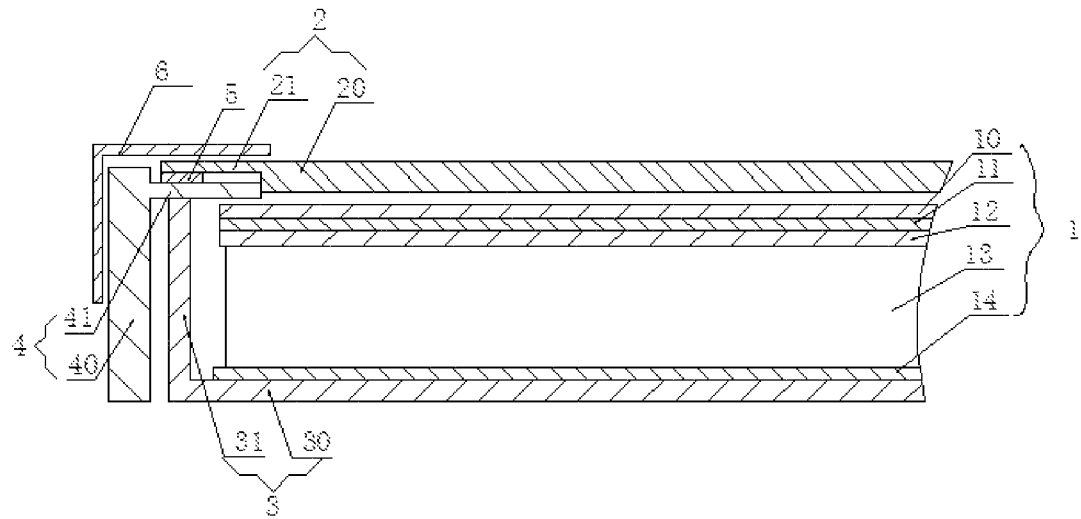
FIG. 1 is a cross sectional view of a prior art liquid crystal display module.
Figure 2:
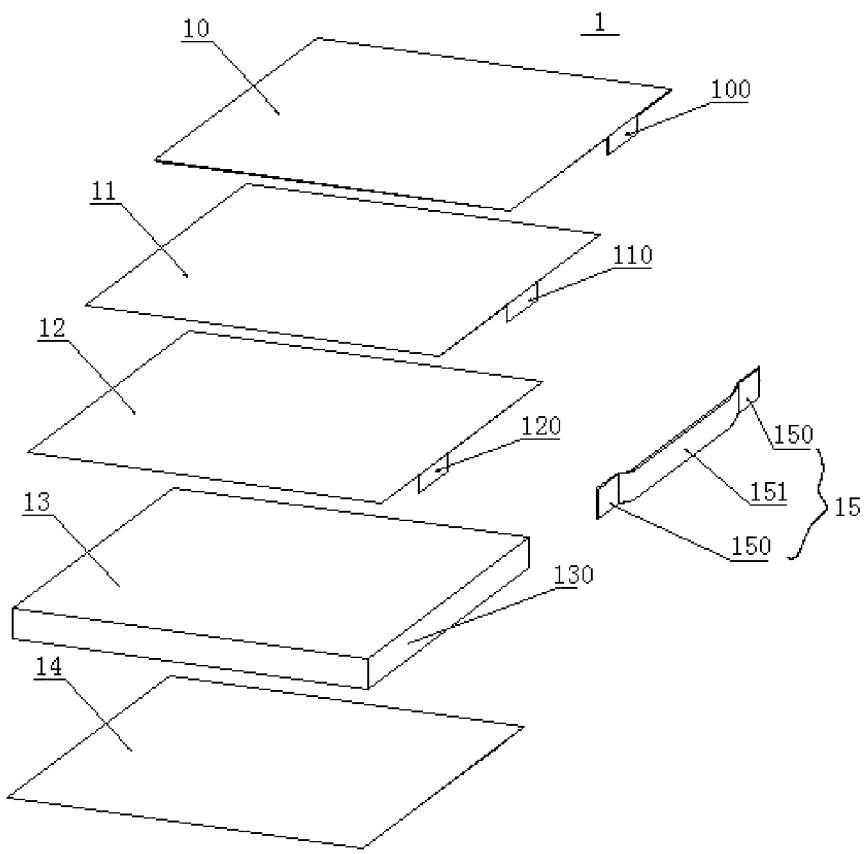
FIG. 2 is an exploded view of a backlight module made in accordance with the present invention.
Figure 4:
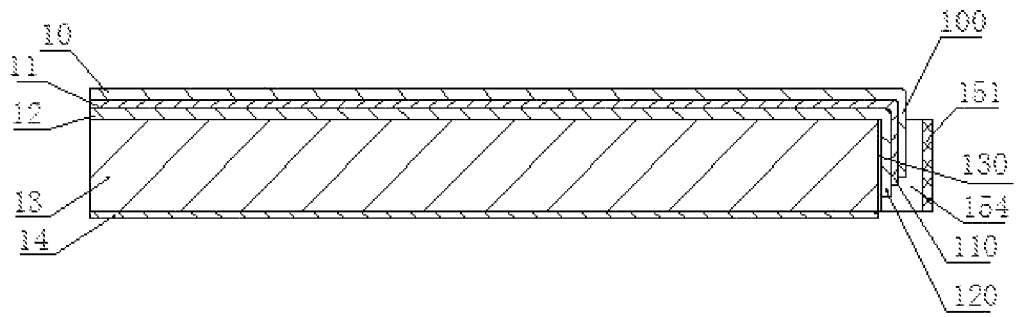
FIG. 4 is a cross sectional view taken alone line A-A of FIG. 3.

Referring to FIGS. 2 and 4, a backlight module made accordance with the present invention is shown. The backlight module 1 includes the following, as clearly shown in Figures.

A waveguide 13 has an incident surface and light-emitting surface. A light source is arranged on a side of the incident surface. In the current embodiment, the incident surface is defined on a side surface of the waveguide 13, and the light-emitting surface is a top surface of the waveguide 13.

An optical film module is arranged above the waveguide 13 and facing the light-emitting surface. The optical film module includes a least one optical film having a crease at one side thereof. Substantially, Preferably, the optical film module includes a first diffuser 10, a prism 11, and a second diffuser 12. Each of the first diffuser 10, the prism 11, and the second diffuser 12 is provided with at least a crease (see 100, 110, and 120 in the drawings) at one side. Each of the creases 100, 110, and 120 can be folded to create a perpendicular relationship with respect to the optical film. The crease can be received within the receiving space defined by the anchoring portions, the bridge portion, and the side portion of the waveguide. With the provision of the optical film module, the light entered the waveguide can be evenly spread and distributed so as to provide a brighter and evenly distributed surface light.

Preferably, the bottom surface of the waveguide 13 is further provided with a mirror 14.

At least a positioning arrangement 15 is arranged on a side surface 130 of the waveguide 13 other than the incident surface. A space 154 is defined between the positioning arrangement 15 and the side surface 130 of the waveguide 13. The creases 110, 110, 120 of the optical film is received within the space 154.

Preferably, the positioning arrangement 15 is generally an elongate shape, and includes A pair of anchoring portions 150 is arranged on opposite ends thereof. The anchoring portions are located on the same level, and flushed to the side surface 130 of the waveguide 13 when attached thereto.

A bridge portion 151 is arranged between those two anchoring portions 150. A receiving space is defined between the anchoring portions 150 and the bridge portion 151, and the side surface of the waveguide.

Preferably, the anchoring portions 150 of the positioning arrangement 15 are glued to the side surface 130 of the waveguide 13. It can be implemented by glue or tape or any equivalent. After the positioning arrangement 15 is securely attached to the side surface 130 of the waveguide 13, the receiving space 154 is then defined by the bridge portion 151 of the positioning arrangement 15 and the side surface 130 of the waveguide 13. In this situation, the creases 100, 110, and 120 can be readily received within the receiving space 154.

Even there is only one positioning arrangement 15 is shown, it should be understood that this is not a limitation, but merely an illustration. In other preferred embodiment, each of the side surfaces of the waveguide 13 can be incorporated with positioning arrangement 15 except the incident surface. Alternatively, the positioning arrangement 15 can be readily arranged only on two side surfaces of the waveguide 13. Correspondingly, each of the optical films can also provided with a corresponding crease with respect to the side surface. Preferably, each side surface of the waveguide 13 is provided with two or more than two positioning arrangements, and the optical film can be provided with corresponding number of creases to match it.

Figure 3:
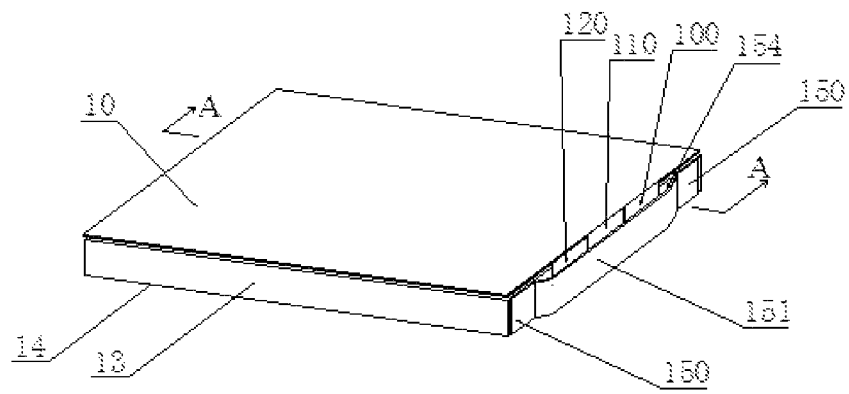
FIG. 3 is an assembled view of FIG. 2.
Figure 5:
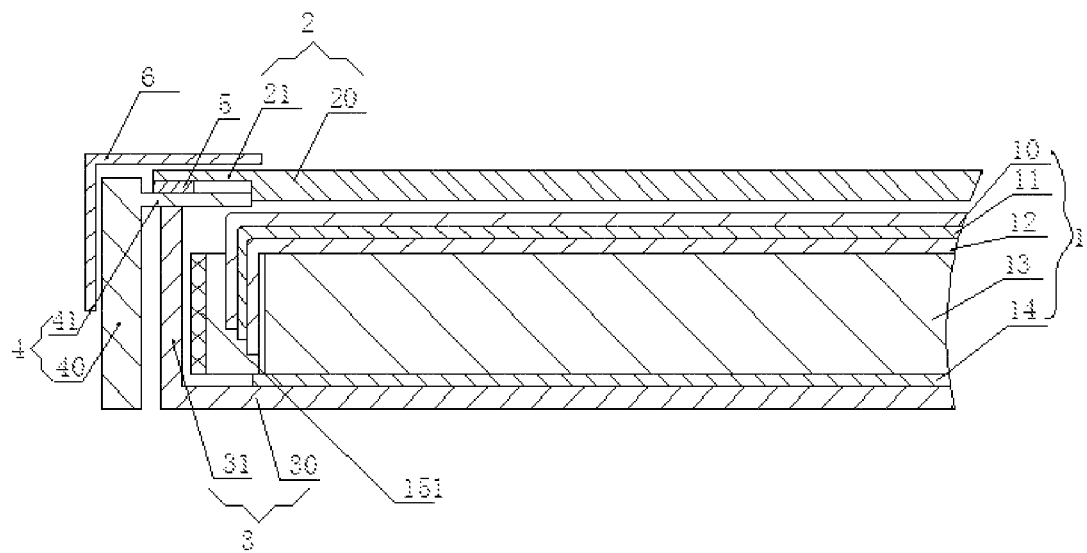
FIG. 5 is a partial and cross sectional view of a liquid crystal display module in which the backlight module shown in FIG. 3 is incorporated.

As shown in FIG. 5, which is a partial and cross sectional view of a liquid crystal display module in which the backlight module shown in FIG. 3 is incorporated. What disclosed here is merely an illustration, while should not be construed as such backlight module can only be implemented into such a liquid crystal display module. As shown in FIG. 5, the liquid crystal display module generally includes a liquid crystal display panel 2, a backlight module 1, and a supporting device. According to the present invention, the backlight module is arranged under the display panel 2 so as to provide illumination to the display panel 2. The supporting device is used to support and secure the display panel 2 and the backlight module 1. The supporting device includes a backboard 3, a plastic frame 4, and a glass substrate 5 covered onto the plastic frame 1. By this arrangement, the display panel 2 is surrounded by the outer frame 6 so as to install the liquid crystal display module into an outer shell of the display module. The backboard 3 has a rectangular base 30 with a plurality of supporting tabs 31 extending upward from peripheral of the base 30 so as to jointly define a receiving space therebetween. The backlight module 1 includes a light source (not shown) and a reflective plate 14, a waveguide 13, and an optical film module which includes a first diffuser 10, a prism 11, and a second diffuser 12. The reflective plate 14, the waveguide 13, and the optical film module are installed onto the base 30 sequentially and located within the receiving space. With this, the backlight module 1 can provide a surface illumination to the display panel. The purpose of the optical film module is used to evenly distribute the surface illumination to the display panel so as to make the patterns and figures clearly shown on the display panel. The plastic frame 4 surrounds the backboard, and includes an outer frame 40 surrounding the supporting tabs 31, and a plurality of platforms 41. Each of the platforms 41 extends horizontally from sides of the outer frame 40 and each of the platforms 41 is properly supported by the supporting tabs 31. Portion of the platform stands on outer peripheral of the optical film module.

According to the embodiment of the present invention, the creases of each of the optical films can be readily received within a receiving space defined between the positioning arrangement and the side surface of the waveguide. As such, the optical films can be securely positioned easily and simply. In addition, in order to ensure the proper positioning of the optical films, a robust clearance is spared. Accordingly, when the optical films is experiencing an expansion or contraction resulted from temperature gradient, the robust can always make the optical films properly seated within the receiving space defined by the positioning arrangement and the waveguide. As a result, the optical films can be effectively prevented from being deformed or creating a waveform deformation. In addition, the positioning arrangement can be readily applied to all kind of liquid crystal display module within any modification or alteration.

Figure 6:
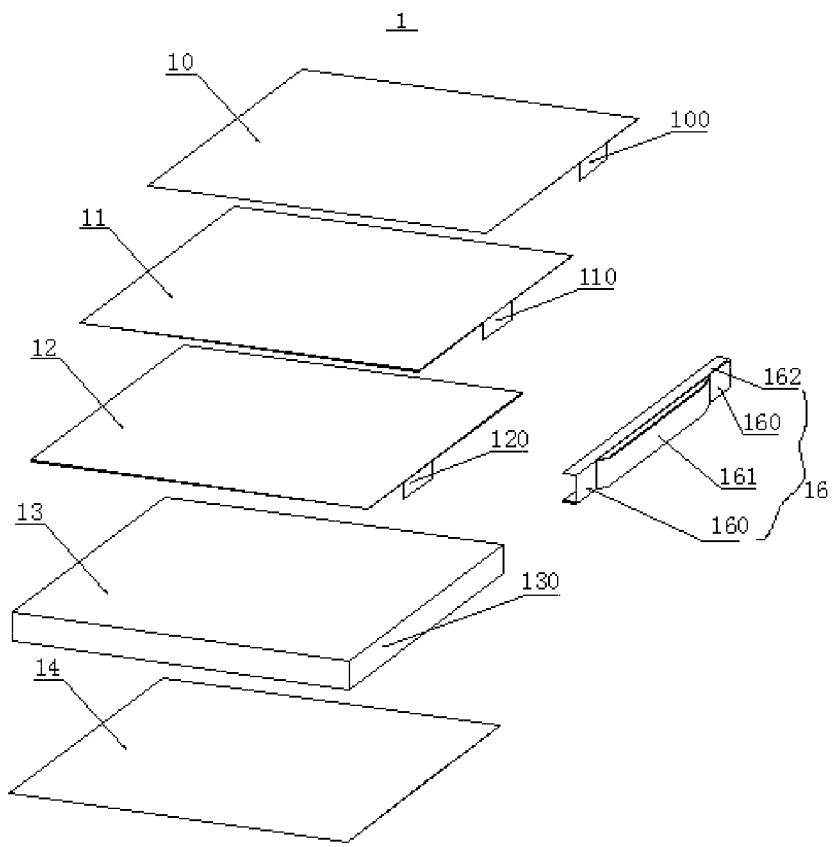
FIG. 6 is an exploded view of a backlight module made according to a second embodiment of the present invention.
Figure 7:
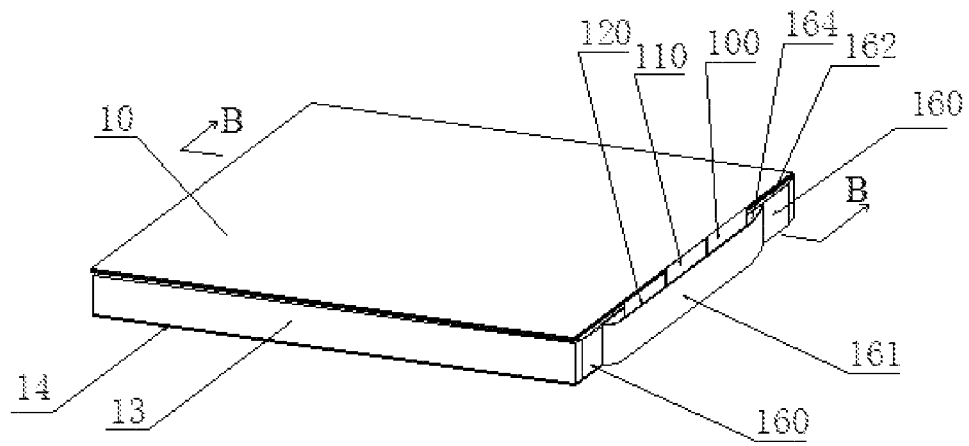
FIG. 7 is an assembled view of FIG. 6.
Figure 8:
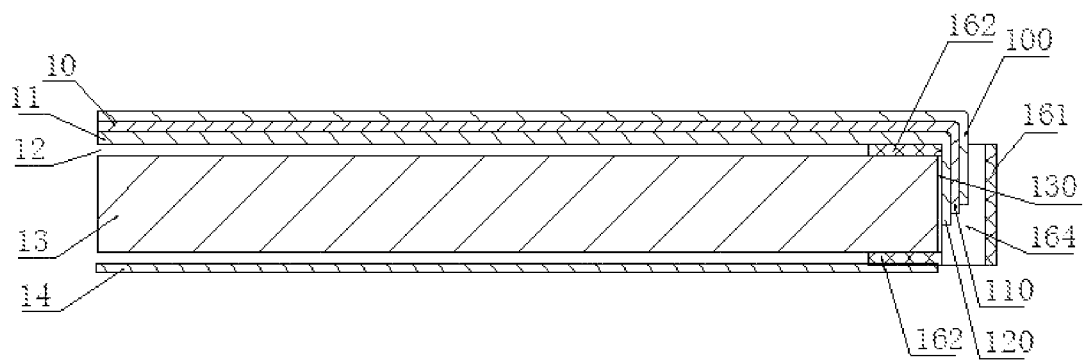
FIG. 8 is a cross sectional view taken along line B-B of FIG. 7.
Figure 9:
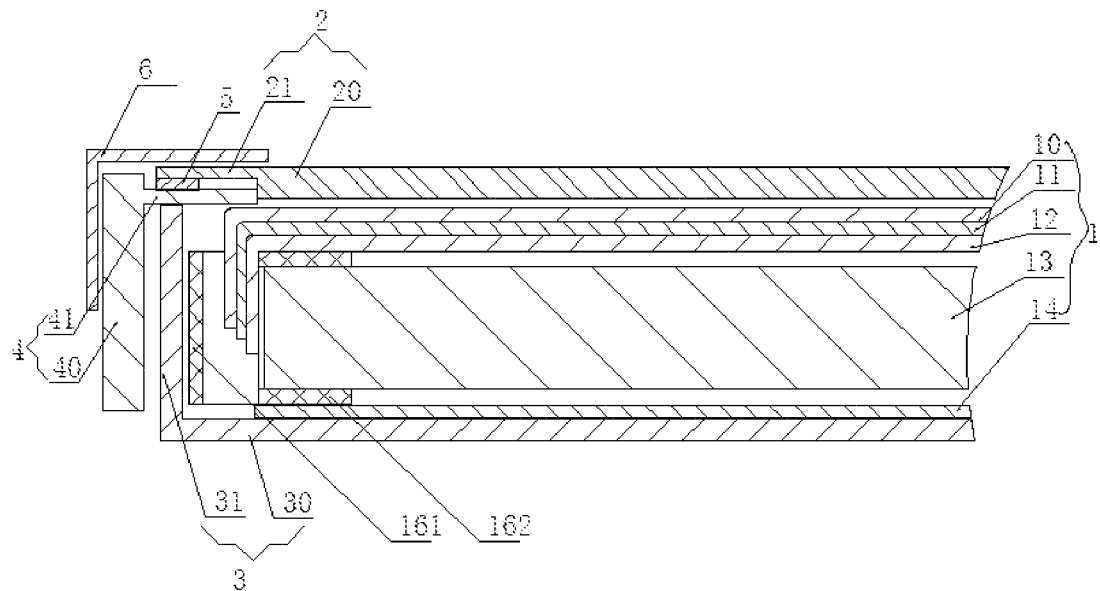
FIG. 9 is a partial and cross sectional view of a liquid crystal display module in which the backlight module shown in FIG. 7 is incorporated.

FIGS. 6 to 8 disclose a backlight module made according to a second embodiment of the present invention. FIG. 9 is a partial and cross sectional view of a liquid crystal display module in which the backlight module shown in FIG. 7 is incorporated.

In this embodiment, the positioning arrangement 16 is slightly different to the positioning arrangement 15 shown in FIG. 2. The current positioning arrangement 16 includes.

A pair of anchoring portions 60 is arranged on opposite ends of the positioning arrangement 16 thereof. The anchoring portions 160 are located on the same level, and flushed to the side surface 130 of the waveguide 13 when attached thereto.

A bridge portion 161 is arranged between those two anchoring portions 160. A receiving space is defined between the anchoring portions 160 and the bridge portion 161, and the side surface of the waveguide.

At least an attaching portion 162 extends perpendicularly from at least one of the anchoring portions 160. The attaching portion 162 can be readily attached to a top surface or bottom surface of the waveguide 13.

The cross sectional view of the positioning arrangement 160 and the attaching portions 162 has an U-shaped configuration which can securely attach to the side of the waveguide 13. With such a configuration, the positioning arrangement 160 can tightly assemble to the waveguide 13.

In the first embodiment, the attaching portions 150 of the positioning arrangement 15 are glued to the side surface 130 of the waveguide 13 by adequate glue or tape. Similarly, the anchoring portions 162 of the positioning arrangement 16 can also be glued to the side surface 130 of the waveguide 13. As the positioning arrangement 15 is securely assembled to the side surface 130, top surface and bottom surface of the waveguide 13, the bridge portion 161 can also create a receiving space 164 with respect to the side surface 130 of the waveguide 13. As a result, the creases 100, 110, and 120 can be readily received within the receiving space 164.

Understandably, in other embodiment, the positioning arrangement 16 can be provided with only one anchoring portion 162.

The working principle as well as the identical part is similar to what disclosed in FIGS. 2 to 5, and not detailed description is given herebelow.

Correspondingly, the present invention further provides a TFT LCD incorporated with a backlight module described above.

The backlight module and the liquid crystal display module provided by the present invention can be concluded with the following advantages.

According to the embodiment of the present invention, the creases of each of the optical films can be readily received within a receiving space defined between the positioning arrangement and the side surface of the waveguide. As such, the optical films can be securely positioned easily and simply.

In addition, in order to ensure the proper positioning of the optical films, a robust clearance is spared. Accordingly, when the optical films is experiencing an expansion or contraction resulted from temperature gradient, the robust can always make the optical films properly seated within the receiving space defined by the positioning arrangement and the waveguide. As a result, the optical films can be effectively prevented from being deformed or creating a waveform deformation.

In addition, the positioning arrangement can be readily applied to all kind of liquid crystal display module within any modification or alteration. As a result, it readily reduces the cost for production.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A backlight module, comprising:
   a waveguide having an incident surface and light emitting surface, a light source being arranged on a side of the incident surface;
   an optical module arranged above the waveguide and facing the light-emitting surface, the optical module including at least one optical film having a crease at one side thereof;
   at least a positioning arrangement arranged on a side surface of the waveguide other than the incident surface, a receiving space being defined between the positioning arrangement and the side surface of the waveguide and with the crease of the optical film received within the space;
   wherein the positioning arrangement has generally an elongate shape, and includes a pair of anchoring portions arranged on opposite ends thereof, wherein the anchoring portions are located on the same level, and flushed to the side surface of the waveguide when attached thereto; and a bridge portion is arranged between those two anchoring portions, the receiving space being defined between the anchoring portions and the bridge portion, and the side surface of the waveguide; and wherein the anchoring portions are glued to the side surface of the waveguide.

2. The backlight module as recited in claim 1, the optical film module includes a first diffuser, a prism, and a second diffuser, wherein each of the first diffuser, the prism, and the second diffuser is provided with at least a crease at one side, wherein each of the creases can be folded to create a perpendicular relationship with respect to the optical film, wherein the crease can be received within the receiving space defined by the anchoring portions, the bridge portion, and the side surface of the waveguide.

3. The backlight module as recited in claim 2, wherein a bottom surface of the waveguide is further provided with a mirror.

4. The backlight module as recited in claim 3, wherein the waveguide and the light source are assembled by a backboard.

5. A backlight module, comprising:
   a waveguide having an incident surface and light-emitting surface, a light source being arranged on a side of the incident surface;
   an optical module arranged above the waveguide and facing the light-emitting surface, the optical module including at least one optical film having a crease at one side thereof; and
   at least an elongate positioning arrangement, including
   a pair of positioning arrangements arranged on a side surface of the waveguide other than the incident surface, a receiving space being defined between the positioning arrangement and the side surface of the waveguide and with the crease of the optical film received within the space;
   a pair of anchoring portions arranged on opposite ends thereof, wherein the anchoring portions are located on the same level, and flushed to the side surface of the waveguide when attached thereto;
   a bridge portion is arranged between those two anchoring portions, a receiving space being defined between the anchoring portions and the bridge portion, and the side surface of the waveguide;
   wherein the positioning arrangement further includes at least an attaching portion extending perpendicularly from at least one of the anchoring portions, for readily attaching to a top surface or bottom surface of the waveguide; and
   wherein the anchoring portions are glued to the side surface of the waveguide, and the attaching portion is also glued to the top or bottom surface of the waveguide.

6. The backlight module as recited in claim 5, the optical film module includes a first diffuser, a prism, and a second diffuser, wherein each of the first diffuser, the prism, and the second diffuser is provided with at least a crease at one side, wherein each of the creases can be folded to create a perpendicular relationship with respect to the optical film, wherein the crease can be received within the receiving space defined by the anchoring portions, the bridge portion, and the side surface of the waveguide.

7. The backlight module as recited in claim 6, wherein the bottom surface of the waveguide is further provided with a mirror.

8. The backlight module as recited in claim 7, wherein the waveguide and the light source are assembled by a backboard.

9. A liquid crystal display module incorporating with at least a backlight module, comprising:
   a waveguide having an incident surface and light emitting surface, a light source being arranged on a side of the incident surface;
   an optical module arranged above the waveguide and facing the light-emitting surface, the optical module including at least one optical film having a crease at one side thereof;
   at least a positioning arrangement arranged on a side surface of the waveguide other than the incident surface, a receiving space being defined between the positioning arrangement and the side surface of the waveguide and with the crease of the optical film received within the space;
   wherein the positioning arrangement has generally an elongate shape, and includes a pair of anchoring portions arranged on opposite ends thereof, wherein the anchoring portions are located on the same level, and flushed to the side surface of the waveguide when attached thereto; and a bridge portion is arranged between those two anchoring portions, the receiving space being defined between the anchoring portions and the bridge portion, and the side surface of the waveguide;
   wherein the positioning arrangement further includes at least an attaching portion extending perpendicularly from at least one of the anchoring portions, for readily attaching to a top surface or bottom surface of the waveguide; and
   wherein the anchoring portions are glued to the side surface of the waveguide, and the attaching portion is also glued to the top or bottom surface of the waveguide.

10. The liquid crystal display module as recited in claim 9, the optical film module includes a first diffuser, a prism, and a second diffuser, wherein each of the first diffuser, the prism, and the second diffuser is provided with at least a crease at one side, wherein each of the creases can be folded to create a perpendicular relationship with respect to the optical film, wherein the crease can be received within the receiving space defined by the anchoring portions, the bridge portion, and the side surface of the waveguide.

11. The liquid crystal display module as recited in claim 10, wherein the bottom surface of the waveguide is further provided with a mirror.

12. The liquid crystal display module as recited in claim 11, wherein the waveguide and the light source are assembled by a backboard.

* * * * *